United States Patent [19]

Gauchel et al.

[11] 4,204,821

[45] May 27, 1980

[54] PROCESS AND APPARATUS FOR THE EXTRUSION OF COATED SKEIN-SHAPED PROFILES, PREFERABLY OF THERMOPLASTIC SYNTHETIC RESINS

[75] Inventors: Peter Gauchel, Alzenbach; Waldemar Wissinger, Siegburg, both of Fed. Rep. of Germany

[73] Assignee: Dynamit Nobel Aktiengesellschaft, Troisdorf, Fed. Rep. of Germany

[21] Appl. No.: 399,982

[22] Filed: Sep. 24, 1973

[30] Foreign Application Priority Data

Sep. 22, 1972 [DE] Fed. Rep. of Germany ....... 2246679

[51] Int. Cl.² .............................................. B29F 3/04
[52] U.S. Cl. .................................. 425/131.1; 425/465; 425/466
[58] Field of Search .......... 425/131, 131.1, 425/133.5, 132, 465, 466

[56] References Cited

U.S. PATENT DOCUMENTS

| | | | |
|---|---|---|---|
| 739,881 | 4/1903 | Kilborn | 425/131.1 |
| 1,428,381 | 9/1922 | Lower | 425/131.1 |
| 2,569,373 | 9/1951 | Fay | 425/131.1 |
| 3,151,356 | 10/1964 | Senecal | 425/131 |
| 3,191,106 | 6/1965 | Baermann | 425/131 X |
| 3,223,761 | 12/1965 | Raley | 425/131 X |
| 3,486,195 | 12/1969 | Greenwood et al. | 425/131.1 |
| 3,486,196 | 12/1969 | Klenk et al. | 425/131 X |
| 3,528,130 | 9/1970 | LeFevre et al. | 425/133.5 |
| 3,754,847 | 8/1973 | Sawada et al. | 425/133.5 |

FOREIGN PATENT DOCUMENTS

1478675  4/1967  France ................................. 425/133

*Primary Examiner*—Mark Rosenbaum
*Attorney, Agent, or Firm*—Craig & Antonelli

[57] ABSTRACT

A process for producing elongated profile members made of thermoplastic synthetic resins having a coating over at least a portion of their circumference of at least one additional thermoplastic polymeric material which includes the steps of extruding a coating of a thermoplastic secondary material, simultaneously and continuously with the extrusion of the elongated profile member, onto said member while said member is still within the plastic temperature range, and subsequently sizing the resultant coated member.

12 Claims, 17 Drawing Figures

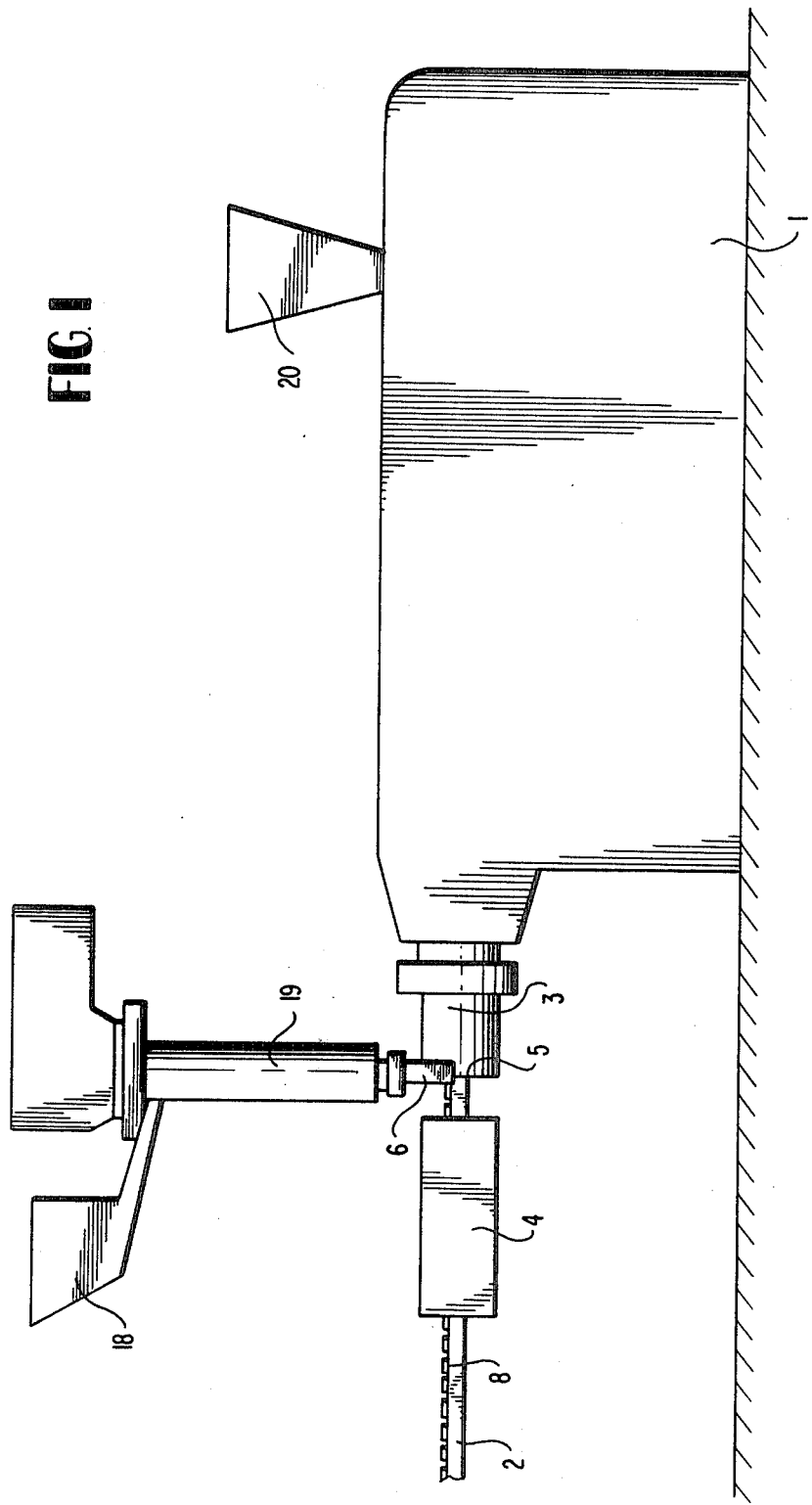

PROCESS AND APPARATUS FOR THE EXTRUSION OF COATED SKEIN-SHAPED PROFILES, PREFERABLY OF THERMOPLASTIC SYNTHETIC RESINS

The present invention relates to a process and apparatus for the extrusion of profile members, preferably of thermoplastic synthetic resins, which are coated at least over a portion of their circumference or outer surface with one or more additional thermoplastic materials.

The coating of extruded shaped members or flat products, for example, of thermoplastic synthetic resins, such as PVC, is effected in order to obtain quality-improved surfaces on these products. Such a coating makes it possible to improve various characteristics of the substrate at a relatively low expense, for example, the lightfastness, the weatherproofness, the flameproofness, the resistance to mechanical stresses, the optical appearance of the surfaces, the density of the surface, the coloring, and so on.

It is an object of this invention to provide a process and apparatus which makes it possible to produce, at minimum expenditure, the extruded article as well as the coating thereof in a single operation.

The process of this invention is executed by extruding the thermoplastic secondary material for the coating, optionally in a thermally insulated fashion, simultaneously and continuously with the extrusion of the elongated shape or profile member of thermoplastic resin onto the member which is still within the deformable or plastic temperature range, and by subsequently sizing the resultant coated product. Suitable for the process of this invention are all thermoplastic polymeric materials which, when processed in the thermoplastic condition and/or in the melt, enter into a sufficiently firm bond with each other. If the materials employed for the extruded profile member and the coating demand differing processing temperatures, this can be accomplished by thermally insulating one material from the other in the extrusion apparatus. A combination of materials which has proven itself well, for example, for use in components in the building industry, such as for example window frames, is based on extruded members of impact-resistant PVC, coated with a layer of polymethyl methacrylate having a molecular weight of, for example, 120,000 to 180,000. In this combination of materials, an excellent adhesion is achieved, wherein the layer thickness can be adjusted in accordance with the technical requirements. The product obtained in accordance with the process of this invention exhibits on its surface essentially the properties of the coating layer. Furthermore, it is also possible to coat, according to the process of this invention, for example, foamed extruded products, e.g. PVC extruded elements, on their surfaces and thus to improve their quality.

In order to conduct the process of this invention, there is provided an extrusion apparatus with a primary extruder or tool for the extrusion of profile members of preferably thermoplastic synthetic resins, with a main extrusion tool and a sizing device. The apparatus of this invention is also characterized in that at least one additional extruder with one or several auxiliary dies for a secondary material is arranged in the zone of the orifice of the main die of the primary extruder. This accessory tool or extruder encompasses at least a partial zone of the circumference of the extruded profile, in correspondence with the extent of the desired coating. The accessory tool can advantageously be arranged so that it terminates at the front end flush with the primary tool, or so that it is disposed partially at the front end in front of the primary tool.

Depending on the type and extent of the coating, it is possible to arrange one or more accessory tools with one or more auxiliary dies in a radial plane around the main die orifice of the primary tool, or also in a series in the axial direction.

For all those cases wherein hollow profile elements are extruded and thus mandrels are provided within the profile for the hollow chambers, it is advantageous to provide that the mandrel or mandrels terminates or terminate flush with the orifice-side front end of the accessory tool. In this way, the possibility is attained to extend the mandrel, which is guided in the hollow chamber adjoining the side to be coated, to the area in front of the main die orifice and thus to afford an additional support for the side of the profile element to be coated.

During the simultaneous extrusion of the profile and the coating thereof, and during the subsequent common sizing of the thus-coated product, care must be taken that the various materials exhibit approximately the same shrinkage values during cooling, in order to avoid a peeling off of the coating. However, this does not exclude the possibility that the secondary material has a different processing temperature than the first material, and for these cases, the provision is made that the accessory tool is arranged and supported at least partially thermally insulated from the primary tool.

In order to be able to vary the thickness of the coating in dependence on the secondary material employed and depending on the requirements, the die outlet slot of the accessory tool is fashioned to be adjustable. This is accomplished, in accordance with this invention, for example by forming the distribution zone preceding the die outlet slot of the accessory tool in the shape of an adjustable slot by the insertion of a sheet or plate made of an appropriate thickness. This construction of the adjustable slot eliminates all inaccuracies which can normally occur during cleaning or finishing operations. The adjustability of the slot, as provided for by the present invention, makes it necessary to make both tool halves of the accessory tool to be planar, so that their spacing is exactly determinable by the interposition of a metal sheet or a plate. By exchanging this sheet for another sheet of different thickness, it is possible in a simple manner to change the thickness of the adjustable slot. In case of damage, an accurate adjustment can be reestablished by additionally grinding the planar surfaces of the tool.

This invention will be further understood from the embodiments illustrated in the accompanying drawings and the following detailed description wherein:

FIG. 1 shows an extrusion plant for practicing the invention in a schematic view;

FIG. 2 and 2a, respectively, show a sectional and a front view of the apparatus of this invention including a primary tool with an accessory tool; FIGS. 3 and 3a, respectively, show a horizontal section and a vertical section through another embodiment of the accessory tool with the primary tool of the invention;

Figure 6:
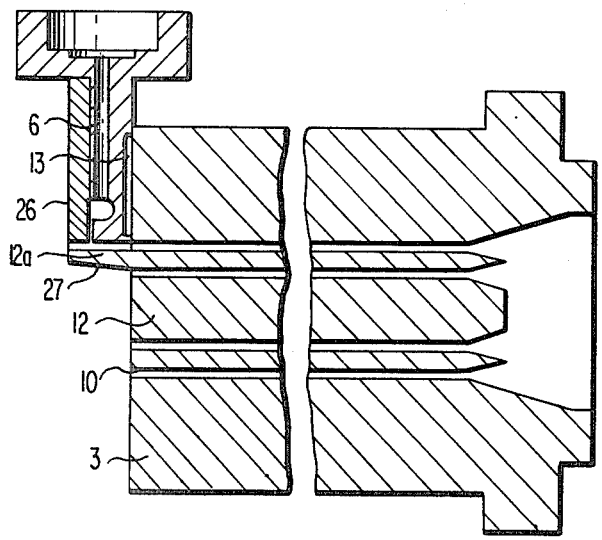
Figure 6A:
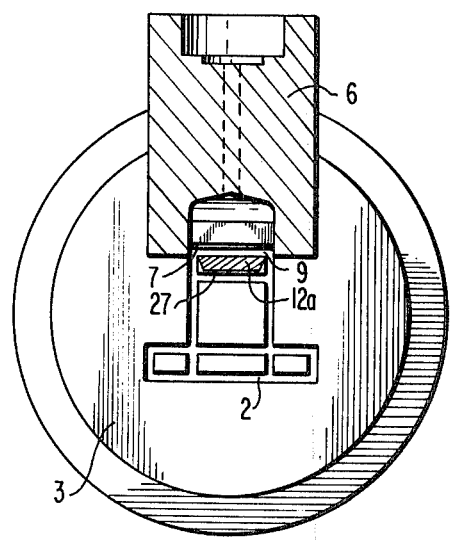
Figure 7:
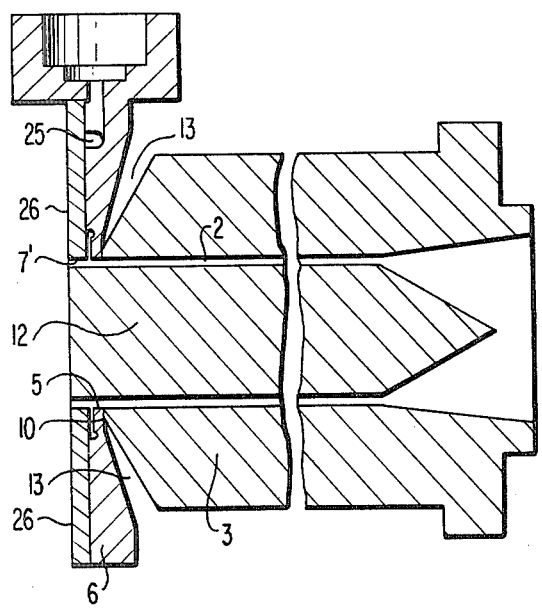
Figure 7A:
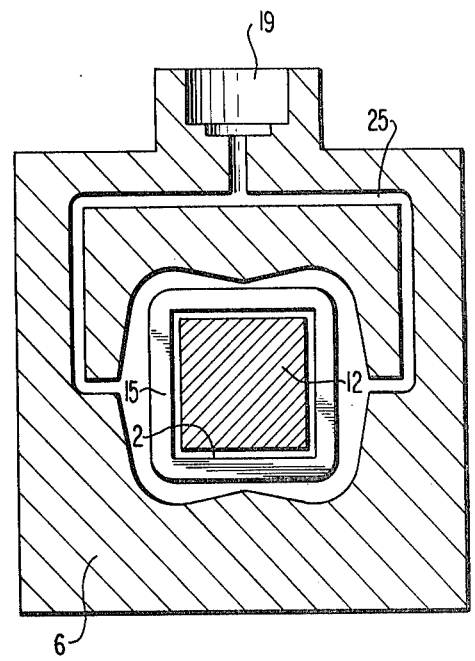
Figure 9:
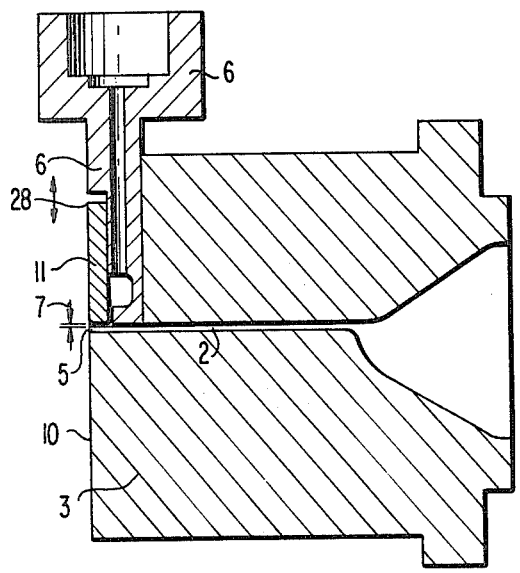
Figure 10:
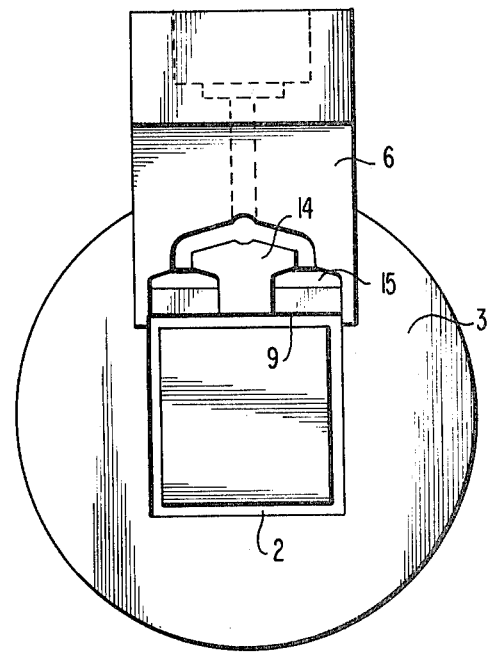

FIGS. 6 and 6a, respectively, show a primary tool with an accessory tool disposed at the front end face thereof, and with the mandrel being pulled forward;

FIGS. 7 and 7a show, respectively, another embodiment of the apparatus shown in FIGS. 6 and 6a for all-around coating;

FIGS. 8, 8a, 8b, and 8c show different views of the configuration of the adjustable slot of the accessory tool;

FIG. 9 shows another means for adjusting the die orifice slot of the accessory tool; and FIG. 10 shows another embodiment of a die orifice for the accessory tool for strip-shaped coating.

FIG. 1 shows schematically an extrusion plant for continuous elongated profile or shaped members, e.g. webs, sheets, channels, beams, rods, etc. The extruder 1 is fed with a thermoplastic primary material 20 for forming the profile member to be extruded and produces, by way of the extrusion tool 3, the profile member 2 which is sized to the precise shape in the sizing device 4 disposed after the extrusion tool 3. The accessory tool 6 is arranged in the zone of the main die orifice 5 of the primary tool 3; this accessory tool conducts a secondary thermoplastic material for providing a coating 8 on the profile member 2 via the auxiliary extruder 19 with material feeding means 18. As the primary material for the profile member 2, hard PVC (polyvinyl chloride) can be utilized, for example, while the secondary material for the coating step can be a polymethyl methacrylate having a molecular weight in the range of from about 120,000 to 180,000, which is well moldable under heat and extrudable and which has any desired coloring (e.g. a dyed coloring). The direct extrusion of the coating 8 onto the simultaneously extruded profile member 2 ensures a satisfactory adhesion of the coating 8 to the profile member 2, which also withstands the subsequent sizing in the sizing device 4 and yields profile members of high dimensional stability and quality. The size of the accessory tool 6 is also dependent on the extent of the coating on the extruded profile member, i.e. the thickness of the coating and the surface of the member provided with the coating.

The advantage of the process of this invention and the associated apparatus is to be seen, inter alia, in that the coating step and the subsequent sizing operation take place in one working phase and in one tool unit area.

Figure 2A:
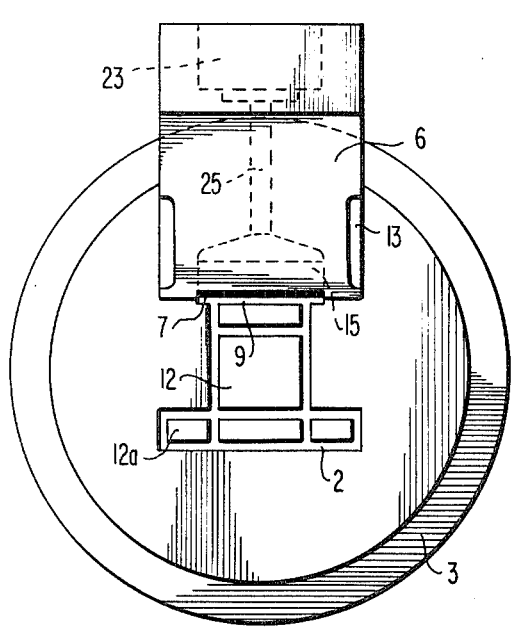
Figure 2:
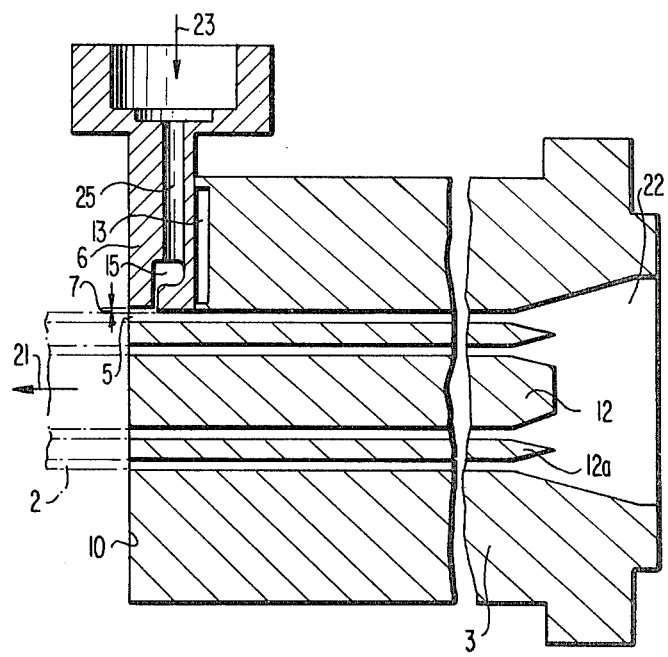

FIGS. 2 and 2a show, respectively, one suitable configuration and construction of the accessory tool 6 with the primary tool 3. The secondary material feed direction indicated by arrow 23 within the accessory tool from the extruder 19 extends here at a 90° angle with respect to the direction of extrusion (designated by arrow 21) of the elongated profile 2. The accessory tool 6 is, for this reason, likewise arranged at 90° with respect to the primary tool and terminates flush at the front end 10 with the main die orifice 5 of the primary tool 3. The free space or clearance 13 between the accessory tool 6 and the primary tool 3 serves for thermal insulation so that the processing temperature of the secondary material cannot be affected by the primary tool. The accessory tool 6 is arranged, in the illustrated embodiment, so that the die orifice 7 of the accessory tool 6 coats one side of the extruded profile member 2, as can also be seen from FIG. 2a. FIG. 2a furthermore shows the feeding of the secondary thermoplastic material 23' through the accessory tool via the feeding ducts 25 and the distribution zone 15 to the auxiliary die opening or orifice 7. The extruded profile member 2, in the illustrated example, is a multiple-chamber hollow member, the cavities of which are formed by the mandrels 12, 12a. The primary material feed to the main tool 3 takes place in the zone 22.

Figure 3A:
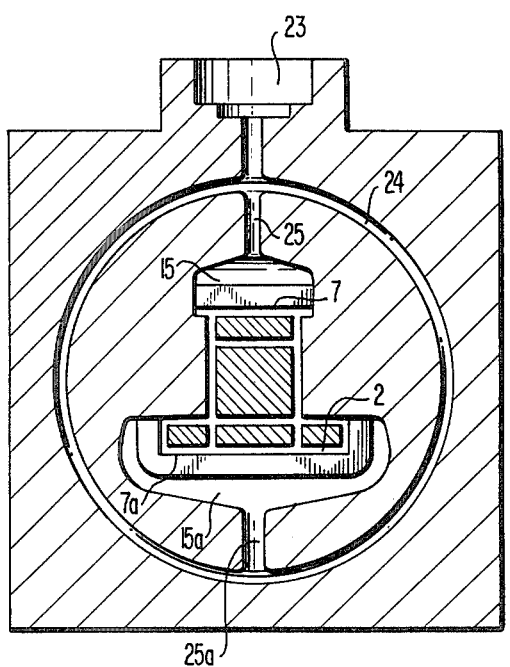
Figure 3:
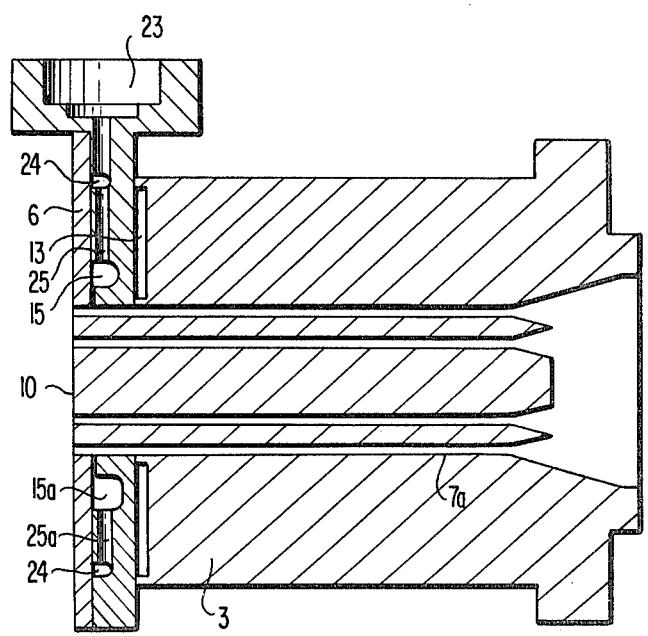

FIGS. 3 and 3a show, as a variant from the configuration of the tool according to FIG. 2, an accessory tool 6 which coats two partial zones of the extruded profile member 2 with a secondary thermoplastic material. The accessory tool 6 is constructed so that it coats, with two auxiliary die openings 7, 7a, two sides of the profile member 2, in this case the sides opposing each other. The secondary material 23' is fed via the ring duct 24, the feeding ducts 25, 25a, the distribution zones 15 and 15a, to the auxiliary die openings 7, 7a. Also, in this embodiment, the accessory tool terminates with the auxiliary die orifice 7 flush with the end face 10 of the primary tool 3.

Figure 4:
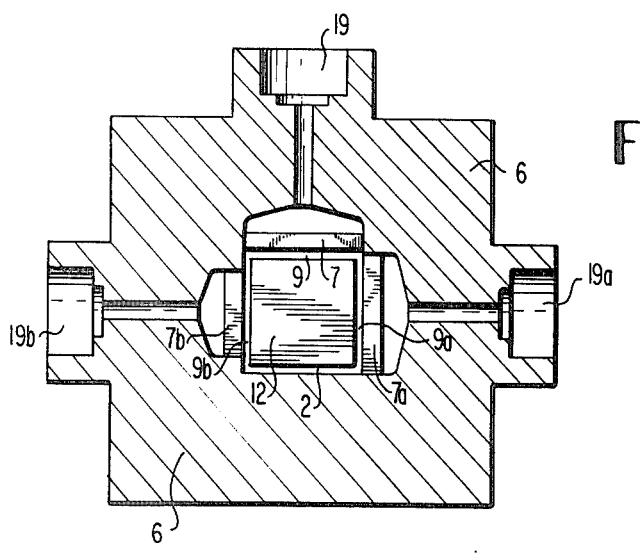
FIG. 4 is a cross section through an accessory tool for multiple-side coating.

In FIG. 4, an accessory tool 6 is illustrated which is equipped with three secondary extruders 19, 19a, and 19b, by which different thermoplastic secondary materials are fed for the coating of several sides 9, 9a, and 9b of a box-shaped elongated profile member 2.

Figure 5:
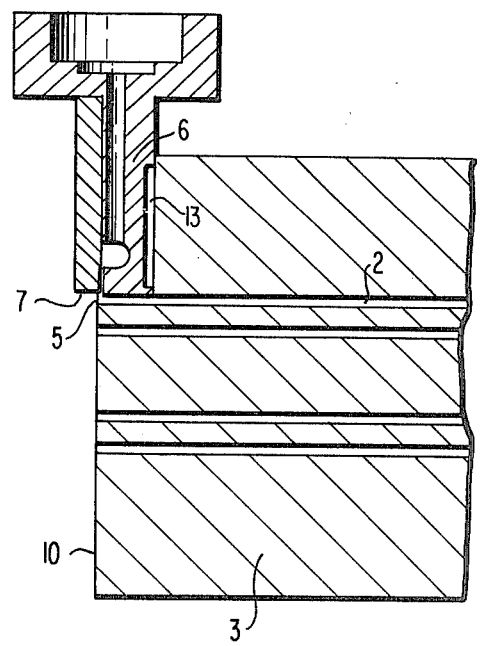
FIG. 5 shows the arrangement of the accessory tool partially in front of the primary tool.

In a variation from the heretofore illustrated arrangement of the accessory tool 6 flush with the end face 10 of the primary tool 3, FIG. 5 shows that the accessory tool 6 is disposed partially in front of the end face of the primary tool 3. In a further embodiment, FIG. 6 shows the accessory tool 6 to be arranged completely in front of the end face 10 of the primary tool, wherein additionally the mandrel 12a forming the cavity of the hollow-chamber elongated member on the side to be coated, is extended outwardly up to the front edge 26 of the accessory tool. This mandrel 12a thus serves simultaneously for the support of the side of the member to be coated, wherein the further sides 27 of the mandrel 12a are slightly beveled, so that the extruded member 2 exiting from the die cannot stick to the mandrel 12a during the solidifying phase.

In another variation from the embodiment shown in FIG. 6, FIGS. 7 and 7a show a tool providing an all-around coating of the extruded hollow profile member 2, but with a single material fed from the secondary extruder 19 via the feeding ducts 25 of the distribution zone 15 for the all-around coating of the profile. Here again, the mandrel 12 for the hollow chamber of the profile member is advanced up to the front end face 26 of the accessory tool 6, in order to effect a universal support of the coated sides of the extruded member 2.

Figure 8:
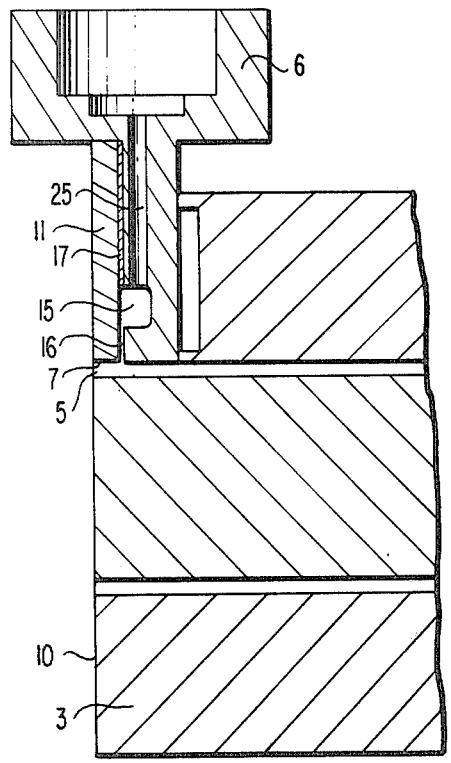
Figure 8B:
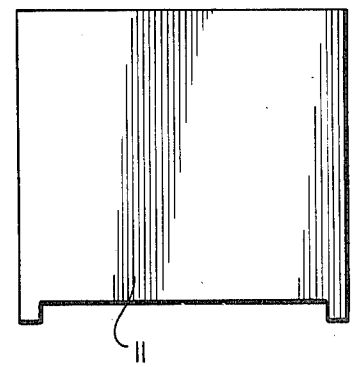
Figure 8A:
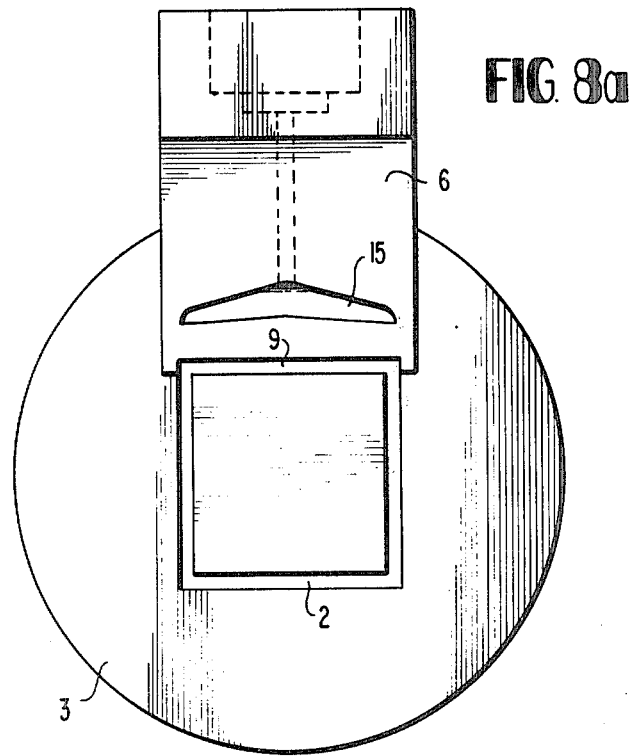
Figure 8C:
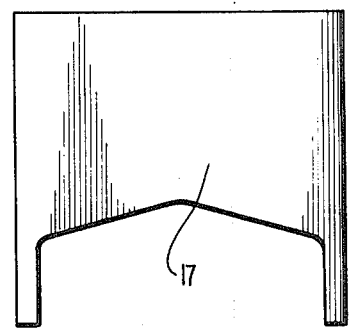

It is of importance for the coated profile members to be produced, on the one hand, so that the quality and thickness of the coating always remain the same and, on the other hand, so that the adjustability and controllability of the thickness of the coating can be effected in dependence on the particular requirements. FIGS. 8, as well as FIGS. 8a, 8b and 8c show an embodiment of the accessory tool 6 with an adjusting device for varying the coating thickness. The thickness of the coating is adjusted in the zone of the accessory tool between the distribution zone 15 and the die outlet opening 7 in the regulating slot 16. Since, especially in a coating process, the thicknesses of the material will frequently be minor, the regulating slot 16 will automatically be very small. Since the usual manufacture of such regulating slots of a tool can be inaccurate and especially change during cleaning and finishing operations, the provision is made in accordance with this invention to insert a regulating sheet or plate means, e.g. a metal regulating sheet 17 between the two tool halves 6, 11 of the accessory tool. By the thickness of this regulating metal sheet and/or this regulating plate, the thickness of the adjustable slot is clearly fixed. It is possible in a simple manner to vary the adjustable slot 16 by exchanging sheet 17 for another sheet of different thickness; also, in case of damage, an accurate adjustment can be reestablished by an additional grinding of the planar surfaces of the tool sections 6 and 11. FIG. 8a shows a front view of the primary tool 3 and the accessory tool 6, while FIG. 8b shows the section of the accessory tool 6, which can also be denoted as a front plate 11, and which is removable. In contrast thereto, FIG. 8c shows the insert sheet 17 for regulating the slot 16 which, of course, is adapted to have a shape conforming to the distribution zone 15 of the accessory tool 6 with respect to its external configuration.

In FIG. 9, another possibility is illustrated for adjusting the thickness of the coating 8 of the profile member 2, in case of a simple, open profile 2. In this connection, the arrangement is such that the die outlet opening 7 of the accessory tool can be adjusted in accordance with the requirements by a vertical adjustment of the end plate 11 of the accessory tool 6 in the direction of the arrow 28.

In a modification of the previously illustrated constructions of the accessory tool 6, FIG. 10 shows the design of the die of the accessory tool for a strip-shaped coating operation. In this embodiment, the outlet slot is subdivided by the arrangement of the sealing piece or choke element 14 in the distribution zone 15 so that a strip-shaped coating with two stripes is achieved on one side of the profile member 2.

Depending on the properties of the coating material as compared to the substrate material for the profile member, different processing temperatures than in the primary tool 3 must be maintained in the accessory tool 6. For this purpose, the zone 13 for the thermal insulation between the accessory tool and the primary tool is provided. This zone can be, for example, purely an air gap, but also can be additionally filled with insulating substances, i.e. thermal insulating materials.

By means of the process and apparatus of this invention, it is possible to coat elongated shaped members or flat products for obtaining quality-improved surfaces in desired thicknesses, wherein this coating operation is effected in one operating step together with the extrusion of the product.

It will be appreciated that many synthetic resins which can be extruded are suitable as basic material for producing the load-supporting extruded profile member of the present invention. These resins include polyvinyl chloride, modified polyvinyl chloride, extrudable ABS resins, polyethylene and polypropylene.

Also, it is possible to use other polymeric materials besides polymethyl methacrylate for preparing a suitable coating thereon during extrusion of the elongated profile member. For example, cellulose acetobutyrate which has properties similar to polymethyl methacrylate can be used in that this material also shows a high weatherability. This material is extruded at a temperature of approximately 155° to 190° C. Also, polymeric materials such as cellulose acetate or cellulose propionate may be used for providing a suitable coating.

When using hard polyvinyl chloride for the basic profile member extrusion is conducted at a temperature of about 190° to 210° C.; whereas polymethyl methacrylate requires an extrusion temperature of from about 200 to about 250° C., depending upon the molecular weight of this polymer. In general the apparatus and process of the present invention is particularly suitable for the simultaneous extrusion of thermoplastic materials having a temperature difference up to about 50° C. In case of a higher temperature difference between the primary thermoplastic material used for making the basic profile member and the secondary thermoplastic material used for the coating layer considerable difficulties may be encountered such as lack of mutual adhesion between the two materials.

In the embodiments of the process heretofore described the extrusion speed of the thermoplastic materials ranges between about 1 m./min. and 1.8 m./min.

While the novel embodiments of the invention have been described, it will be understood that various omissions, modifications and changes in these embodiments may be made by one skilled in the art without departing from the spirit and scope of the invention.

What is claimed is:

1. An extrusion device for the extrusion of elongated profiled members made of thermoplastic synthetic resins which are simultaneously provided with at least one thermoplastic coating of a synthetic resin over at least a portion of their circumferences, said device comprising a primary extruder means for extruding a primary thermoplastic material in the form of an elongated profiled member through an orifice of a main die, at least one accessory extruder means having at least one auxiliary die for extruding at least one coating of a secondary thermoplastic material, said accessory extruder means being disposed closely adjacent to the main die of said primary extruder whereby said at least one coating is continuously extruded onto said member while said member is still within the plastic temperature range, said at least one auxiliary die having an adjustable outlet slot and a distribution zone preceding said outlet slot for effecting distribution of the secondary thermoplastic material for forming a coating, and plate means for adjusting the size of said slot whereby the thickness of the coating applied via said outlet slot can be regulated, said plate means comprising a metal plate insertable into said at least one accessory extruder means, said metal plate having a cutout portion that defines a portion of said distribution zone and also defines said outlet slot.

2. The extrusion device according to claim 1, in which the accessory extruder means is arranged to encompass at least a partial zone of the circumference of the extruded profile member.

3. The extrusion device according to claim 1, in which the accessory extruder means is disposed at an end face at the primary extruder means so that it terminates planar with the end face of the primary extruder means.

4. The extrusion device according to claim 1, further comprising means positioned between said primary extruder means and said accessory extruder means for at least partially thermally insulating said accessory extruder means from said primary extruder means.

5. The extrusion device according to claim 4, in which the accessory extruder means is disposed at least partially at an end face in front of the primary extruder means whereby a radial die exit slot of the accessory extruder means terminates at the end face approximately together with the primary extruder means.

6. The extrusion device according to claim 5 for the extrusion of hollow profile members further comprising a mandrel arranged within the main die of the primary extruder, said mandrel being disposed so that one end of the mandrel terminates flush with the end face of the accessory extruder means on the outlet side.

7. The extrusion device according to claim 1, in which the accessory extruder means is disposed at least partially at an end face in front of the primary extruder means whereby said outlet exit slot of the accessory extruder means terminates at the end face approximately together with the primary extruder means.

8. The extrusion device according to claim 1, further comprising a sizing device positioned downstream of the orifice of the main die and of the at least one auxiliary die of the at least one accessory extruder means to effect sizing of the resultant coated elongated profiled member.

9. An extrusion device for the extrusion of elongated profiled members made of thermoplastic synthetic resins which are simultaneously provided with at least one thermoplastic coating of a synthetic resin over at least a portion of their circumferences, said device comprising a primary extruder means for extruding a primary thermoplastic material in the form of an elongated profiled member through an orifice of a main die, at least one accessory extruder means having at least one auxiliary die for extruding at least one coating of a secondary thermoplastic material, said accessory extruder means being disposed closely adjacent to the main die of said primary extruder whereby said at least one coating is continuously extruded onto said member while said member if still within the plastic temperature range, said at least one auxiliary die having an adjustable outlet slot and a distribution zone preceding said outlet slot for effecting distribution of the secondary thermoplastic material for forming a coating, and plate means for adjusting the size of said slot whereby the thickness of the coating applied via said outlet slot can be regulated, said distribution zone being formed in part by said plate means, said plate means comprising a plate made of appropriate thickness and insertable into said accessory extruder means, said plate having a cutout portion defining a part of said distribution zone and also defining the adjustable outlet slot which leads from said distribution zone to an outlet of said at least one auxiliary die.

10. An extrusion device for the extrusion of elongated profiled members made of thermoplastic synthetic resins which are simultaneously provided with at least one thermoplastic coating of a synthetic resin over at least a portion of their circumferences, said device comprising a primary extruder means for extruding a primary thermoplastic material in the form of an elongated profiled member through an orifice of a main die, at least one accessory extruder means having at least one auxiliary die for extruding at least one coating of a secondary thermoplastic material, said accessory extruder means being disposed closely adjacent to the main die of said primary extruder whereby said at least one coating is continuously extruded onto said member while said member is still within the plastic temperature range, said at least one auxiliary die having an adjustable outlet slot and a distribution zone preceding said outlet slot for effecting distribution of the secondary thermoplastic material for forming a coating, and plate means for adjusting the size of said slot whereby the thickness of the coating applied via said outlet slot can be regulated, said outlet slot being an auxiliary slot leading from said distribution zone to a die outlet of said at least one auxiliary die, and said plate means comprising a metal plate of appropriate thickness which is insertable into said accessory extruder means, the thickness of said insertable metal plate determining the thickness of said outlet slot.

11. An extrusion device for the extrusion of an elongated profile member made of thermoplastic synthetic resin which is simultaneously provided with a thermoplastic coating of a synthetic resin over a portion of the circumference of said member, said device comprising a primary extruder means for extruding a primary thermoplastic material in the form of an elongated profile member through an orifice of a main die, an accessory extruder means having an auxiliary die for extruding a coating of a secondary thermoplastic material onto said profile member, said auxiliary die having an adjustable outlet and a distribution zone preceding said adjustable outlet for effecting distribution of the secondary thermoplastic material to said adjustable outlet for forming the coating on said profile member, and plate means for adjusting the size of said outlet whereby the thickness of the coating applied via said outlet can be regulated, said plate means including an end plate of the accessory extruder means, said end plate being moveable away and towards said adjustable outlet, said end plate having one planar surface which defines a portion of the distribution zone and another planar surface which defines a portion of said outlet and said end plate being spaced from a part of said accessory extruder means to define an outlet slot leading from said distribution zone to said adjustable outlet.

12. An extrusion device for the extrusion of an elongated profile member made of thermoplastic synthetic resins which is simultaneously provided with a thermoplastic coating of a synthetic resin over a portion of the circumference of said member, said device comprising a primary extruder means for extruding a primary thermoplastic material in the form of an elongated profile member through an orifice of a main die, an accessory auxiliary extruder means having an auxiliary die for extruding a coating of a secondary thermoplastic material, said accessory extruder means being disposed closely adjacent to the main die of said primary extruder means whereby said coating is continuously extruded onto said member while said member is still within the plastic temperature range, said auxiliary die having an adjustable outlet means and a distribution zone preceding said adjustable outlet means for effecting distribution of the secondary thermoplastic material into said adjustable outlet means for forming the coating on said member, said adjustable outlet means being a slot extending from said distribution zone to a die outlet opening of said auxiliary die, said plate means comprising a metal plate of appropriate thickness which is insertable into said accessory extruder means, the thickness of said insertable metal plate determining the thickness of said slot, and said insertable metal plate comprising a plate having two planar surfaces spaced parallel from each other, the space between said surfaces defining the thickness of said plate.

* * * * *